United States Patent [19]
Wiegand

[11] 3,866,193

[45] Feb. 11, 1975

[54] ASYMETRIC BISTABLE MAGNETIC DEVICE

[75] Inventor: John Richard Wiegand, Valley Stream, N.Y.

[73] Assignees: Milton Velinsky, Plainfield, N.J.; John R. Weigand, Valley Stream, N.Y. ; part interest to each

[22] Filed: Nov. 15, 1973

[21] Appl. No.: 416,081

Related U.S. Application Data

[63] Continuation-in-part of Ser. Nos. 247,356, April 25, 1972, Pat. No. 3,820,090, and Ser. No. 173,070, Aug. 19, 1971, abandoned, and Ser. No. 137,567, April 26, 1971, abandoned, and Ser. No. 86,169, Nov. 2, 1970, abandoned, and Ser. No. 189,027, Oct. 13, 1971, Pat. No. 3,783,249, and Ser. No. 5,632, Jan. 27, 1970, abandoned, and Ser. No. 269,525, July 7, 1972, Pat. No. 3,818,465, and Ser. No. 52,571, July 6, 1970, abandoned, and Ser. No. 173,706, July 22, 1971, Pat. No. 3,774,179.

[52] U.S. Cl. ..... 340/174 ZB, 29/604, 340/174 TW, 340/174 MS, 340/174 VC

[51] Int. Cl. ...................................... G11c 11/12

[58] Field of Search ........... 340/174 TW, 174 MS, 340/174 VC, 174 ZB; 29/604; 72/378

[56] References Cited

UNITED STATES PATENTS

| | | | |
|---|---|---|---|
| 3,134,096 | 5/1964 | Bartkus et al. | 340/174 VC |
| 3,287,708 | 11/1966 | Anderson et al. | 340/174 TW |

*Primary Examiner*—James W. Moffitt
*Attorney, Agent, or Firm*—Ryder, McAulay, Fields, Fisher & Goldstein

[57] ABSTRACT

A ferromagnetic wire device worked by torsional straining to provide a shell portion that is magnetically harder than the core portion. The greater coercivity of the shell and/or the greater strain in the shell enables the shell to use the core for the completion of a flux path. The application and removal of an external magnet changes the magnetization of the core to provide a sharp distinct change in the flux external to the wire. A pick-up coil provides a distinct output pulse. A portion of the wire segment is compressed radially with the result that this switching action is eliminated in the portion compressed. By having either left hand or right hand portions of the wire compressed, a set of wires, each about 0.5 inches long, can be arranged to provide a binary code.

16 Claims, 5 Drawing Figures

ASYMETRIC BISTABLE MAGNETIC DEVICE

REFERENCE TO RELATED PATENT APPLICATIONS

This patent application is a continuation-in-part of each of the following patent applications:

Ser. No. 247,356 filed Apr. 25, 1972 and now U.S. Pat. No. 3,820,090 entitled BISTABLE MAGNETIC DEVICE and its three abandoned parent applications Ser. No. 173,070 filed Aug. 19, 1971, Ser. No. 137,567 filed Apr. 26, 1971 and Ser. No. 86,169 filed Nov. 2, 1970.

Ser. No. 189,027 filed Oct. 13, 1971 and now U.S. Pat. No. 3,783,249 entitled CODED MAGNETIC CARD AND READER and its abandoned parent application Ser. No. 5,632 filed Jan. 27, 1970.

Ser. No. 269,525 filed July 7, 1972 and now U.S. Pat. No. 3,818,465 entitled TRAVELLING MAGNETIC DOMAIN WALL DEVICE and its abandoned parent application Ser. No. 52,571 filed July 6, 1970.

Ser. No. 173,706 filed July 22, 1971 and now U.S. Pat. No. 3,774,179 entitled FERROMAGNETIC STORAGE MEDIUM.

BACKGROUND OF THE INVENTION

This invention relates to a magnetic device in the form of a wire segment which has two stable magnetic states. The device itself is related to the device disclosed in the above-mentioned patent application Ser. No. 247,356. As described in that patent application, a wire, for example, ⅝ths of an inch in length and with a diameter of 0.012 inches of a nickel-iron material is processed to have a relatively soft magnetic core and a relatively hard magnetic shell. When magnetized, the higher coercivity of the shell captures the core so that the path of the magnetic flux from the shell is completed through the core. An external magnetic field of proper polarity and sufficient strength when brought close to the wire will capture the core from the shell and thus reverse the direction of magnetization in the core. This capture causes the flux path from the shell to be completed external of the wire. The resultant change of state is very rapid creating a rapid change in the magnitude of the flux external to the wire and thereby inducing a sharp clearly recognizable pulse in a pickup coil placed adjacent to the wire. Removal of the external magnetic field results in the shell recapturing the core. This recapture of core by shell (reset) also occurs very rapidly so that a distinctive pulse is induced in the pickup coil. The various advantages of this device are discussed in the abovementioned patent application.

In certain applications, a reading head is employed to cause the wire to switch state and to provide an output pulse in response to the state switch. Such a head is moveable relative to the wire, carries a magnet and a pickup coil. As the head moves closer to the wire, the magnetic field from the magnet increases until a threshhold is reached at which point the wire switches state and the pickup coil provides an output pulse.

Among the applications for this bistable magnetic wire is that of use in a coded magnetic card as described in patent application Ser. No. 189,027 listed above. In this coded card application and in other binary coding applications, a dual head is employed in which wires are offset from one another so that wires on the left are read by one of the two heads and wires on the right by the other of the two heads. Accordingly, a binary code is provided. The bit read out is a function of which of the two heads serve to switch the state of the wire and provide the read-out signal.

The difficulty is that it is usually desirable to read such binary coded devices very rapidly. In reading them rapidly, the normal interaction of a magnetized device (the wire in this case) and the read head provide a rate signal which becomes greater as the speed with which the wire and the read head pass each other increases. This rate signal interfers with the non-rate sensitive coding signal.

Accordingly, it is a major purpose of this invention to provide a modified structure of the bistable wire described in patent application Ser. No. 247,356 which can be used for coding applications yet will permit the cancelling out of the rate sensitive signal so that only the non-rate sensitive coded signal will be produced.

In other applications such as those described in the above-mentioned patent application Ser. No. 269,525 it is often desirable to determine or control the direction in which a transverse domain wall travels when the bistable magnetic wire device is switched in state. This control over the direction in which the core is captured permits the kind of control that makes possible such items as a storage device.

Accordingly, it is a further purpose of this invention to provide a modified structure which determines the direction in which the transverse domain wall travels during switching of magnetic state.

Although the above two major purposes of this invention are in terms of purposes substantially unrelated to one another, it turns out that these purposes are achieved by the structure of this invention.

BRIEF DESCRIPTION OF THE INVENTION

In brief, this invention involves a wire of magnetic material which is so worked as by torsional straining so that the radially outer portion of the wire, a shell portion, becomes magnetically harder than the core portion. This wire, the operation and manufacture of which is described in said patent application Ser. No. 247,356, is then treated so that one segment of it has its switching properties cancelled. This "cancelled" segment is achieved by deforming the segment involved; for example, by compressing it so that the diameter is decreased by 20 percent along one diameter.

This compressing may be enough of a work hardening or relief of tension at one end so that the coercivity or strain between core and shell at that end is no longer sufficiently great to generate the switching effect between core and shell.

Regardless of the explanation for the result, there is provided by this invention a wire that appears to have a magnetically distinctive core portion that extends only partly axially through the wire. Thus, a portion of the wire has a higher coercivity shell portion around a lower coercivity core portion. In the rest of the wire (that is, the compressed portion of the wire) there is no operative core but only a through section having a relatively unitary magnetic phase.

BRIEF DESCRIPTION OF THE DRAWINGS

FIG. 1 illustrates two examples which differ only in magnetization and spatial orientation to each other.

FIG. 2 also shows two examples of the invention which differ from each other only in magnetization and spatial orientation to each other.

FIG. 3 illustrates the relation between the FIG. 1 device and the reading head at about the moment of state switch that provides an output pulse. FIG. 3 also provides a perspective view of the FIG. 1 device.

FIGS. 4 and 5 contrast the flux path through the pick-up coil when reading the two spatial orientations shown in FIG. 1 for the device of this invention.

DESCRIPTION OF THE PREFERRED EMBODIMENTS

Figure 1:
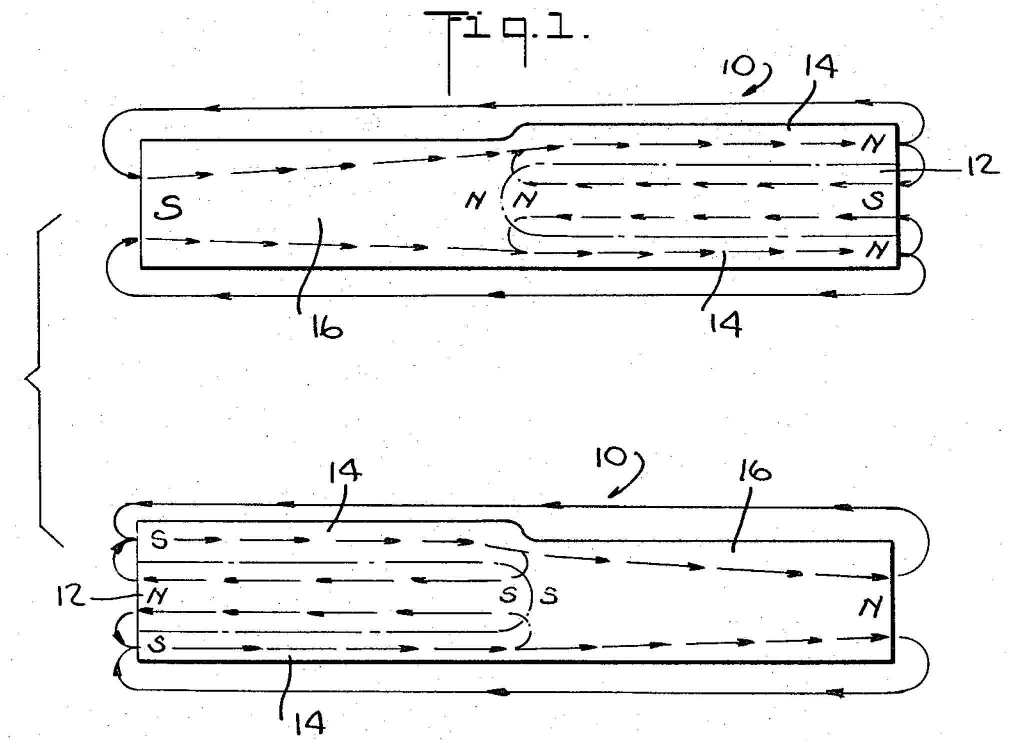
FIG. 1 is a schematic representation of the device of this invention in the low energy magnetic state; that is, when magnetized but in the absence of an external magnetic field and thus in the state where the shell has captured the core.
Figures 2, 4, 5:
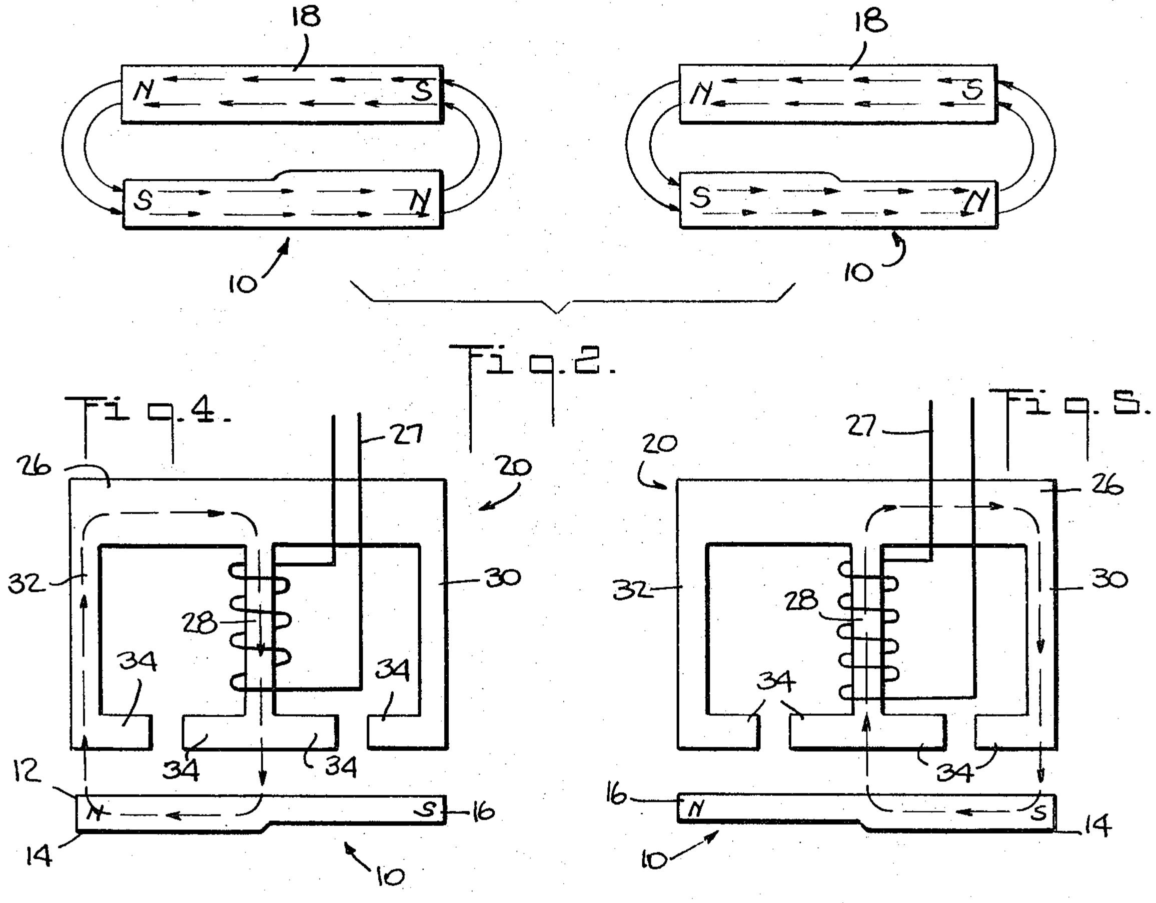
FIG. 2 is a schematic representation on a somewhat smaller scale of the FIG. 1 device in the high energy state; that is, in the presence of an external magnetic field strong enough to capture the core.
FIGS. 4 and 5 are schematic representations, along a longitudinal section through the FIG. 3 reading head; the section being taken along the axis of the FIG. 1 device at about the point of state switch that provides an output pulse.

FIGS. 1 and 2 illustrate the two states of the device of this invention. Two examples are shown in each FIG. to illustrate the relationship between devices used to embody a binary code. A 0.4 inch segment of ferromagnetic wire 10, worked in the fashion described hereinafter and which has been magnetized, has a rest state (that is, low energy state) substantially as shown in FIG. 1. In this rest state, a core portion 12 and a surrounding shell portion 14 have opposite magnetizations (as shown by the arrows and indicated polarity) and a portion of the flux generated by the magnetically harder shell 14 is coupled through the magnetically softer core 12 as represented by flux lines in FIG. 1. This core 12 and shell 14 portion may be half the length of the wire segment 10. In addition there is a portion 16 which has no apparent magnetically distinct core and shell. The portions 14 and 16 together appear to exhibit a common direction of magnetization. The core portion 12 provides a return path for a portion of the flux generated by the shell 14 to provide the flux path arrangement shown.

The dash-dot lines indicated are to suggest the separation between the core portion 12 and the rest of the device (shell 14 and end 16). As a practical matter, the separation between the core portion 12 and the portions 14, 16 is probably a lot more complex than is suggested by the dash-dot lines employed in FIG. 1.

As shown in FIG. 2, when an outside magnet 18 is brought close to the wire 10 and where this outside magnet 18 has polarities opposed to that of the shell 14, end 16, this outside magnet will, if its strength is sufficiently great, complete its flux path through the relatively low reluctance of the wire 10. When this occurs, the core portion 12 as well as the shell 14 and end 16 portions are dominated by the outside magnet producing the state shown in FIG. 2. As a result, the core portion 12 is no longer available for the completion of a path for flux generated by the shell 14. At a critical position of the outside magnet 18 relative to the wire 10, there is a rapid and sudden switch of state from that shown in FIG. 1 to that shown in FIG. 2. When this occurs, the shell 14 generated flux that was completed through the core 12 must be completed through the air around the wire 10. This increase in flux is a sudden and rapid occurrence which will generate a sharp and distinctive pulse in a pickup coil.

The referenced patent application Ser. No. 247,356 illustrates a similar device in which the shell and core extend axially along the entire length of the wire 10. In such a device, the switch from the low energy rest state (comparable to that of FIG. 1) to the high energy or capture state (comparable to that of FIG. 2) or back again, results in a flux change of a distinctive and rapid sort throughout the length of the wire 10. However, in the device of this invention, there is no switching in the portion 16 so that this distinctive flux change is not evidenced along the full length of the wire 10. One important result of this factor is that the device 10 of this invention can be used as a basic building block unit for a binary code which, when read, will provide unambiguous output readings regardless of the rate at which these units 10 are passed through a reading head.

Two examples of the invention are shown in FIGS. 1 and 2. They are essentially the same even to having the same direction of magnetization. But, as indicated in the FIGS., in one case the shell 14 is on the right (as seen in the FIGS.) and in the other case the shell 14 is on th left. When so oriented relative to each other, one can serve as the 1 bit and the other as the 0 bit of a binary code. When a wire segment 10 having a physical orientation of that shown on the left in FIGS. 1 and 2 is fed through the read head described herein, an output pulse of a given polarity is obtained. By contrast, when a wire having the physical orientation of that shown on the right in FIGS. 1 and 2 is fed through the read head described herein, the output pulse will have an opposite polarity.

Method of Manufacture

The method of manufacturing the wire 10 of this invention is essentially the same as that disclosed in the referenced patent application Ser. No. 247,356 with the added step that the portion 16 is compressed by an amount that is preferably 20 percent of the diameter of the wire.

More specifically, the presently preferred mode of fabricating the wire of this invention is to employ a wire, for example, a ferromagnetic alloy of 48 percent iron and 52 percent nickel having a fine grain structure, one of not less than 6,000 grains per square millimeter and preferably with a grain count of at least 8,000 grains per square millimeter and more desirably with a grain count of 10,000 or more gains per square millimeter. A length of the wire, for example, a one meter length, is elongated about 4 percent. This is done simply by stretching the wire axially. After it has been stretched, the tension required to cause the stretching is released. The wire is then held at a constant tension of approximately 450 grams. While being held at this constant tension the wire is circumferentially strained. It has been found that good results are obtained by twisting the wire approximately 40 turns per meter of wire in a first direction (e.g. counterclockwise) then untwisting the wire the same amount in the opposite direction (i.e., clockwise) and repeating this twisting and untwisting operation about ten or twelve times.

At present, the preferred wire diameter is 0.010 inches (10 mils) since such has been found to provide a desirable compromise between ease of handling and optimum output pulse. However, wire diameters of 8 and 12 mils have been successfully used and may even be preferrable in some applications.

The wire thus provided is one that will operate in the manner disclosed in somewhat greater detail in patent application Ser. No. 247,356. To obtain the switching device of this invention, this wire is then cut into desired segments as, for example, a length of 0.5 inches. One-half the length of the wire is then simply compressed by an amount equal to 20 percent of the diameter of the wire. This compression appears to cancel out the switching effect in the portion of the wire that is compressed. Whether this is because of a work hardening, a relief of axial tension between shell and core or a relief of torsional strain, or perhaps for some other reason, is not presently known. However, it has been found that this compression does, indeed, have the result described.

The above method of prestretching and torsional straining requires some trial and error to get the best results. The amount of prestretch, the number of twists per unit of length, the tension during twisting and the number of cycles of repeated counterclockwise and clockwise twisting, are variables. The optimum combination of these variables is a function of type of wire used, wire diameter and ultimate application. In any case, the above-described specific method provides usable results.

A Pick-Up Head

Figure 3:
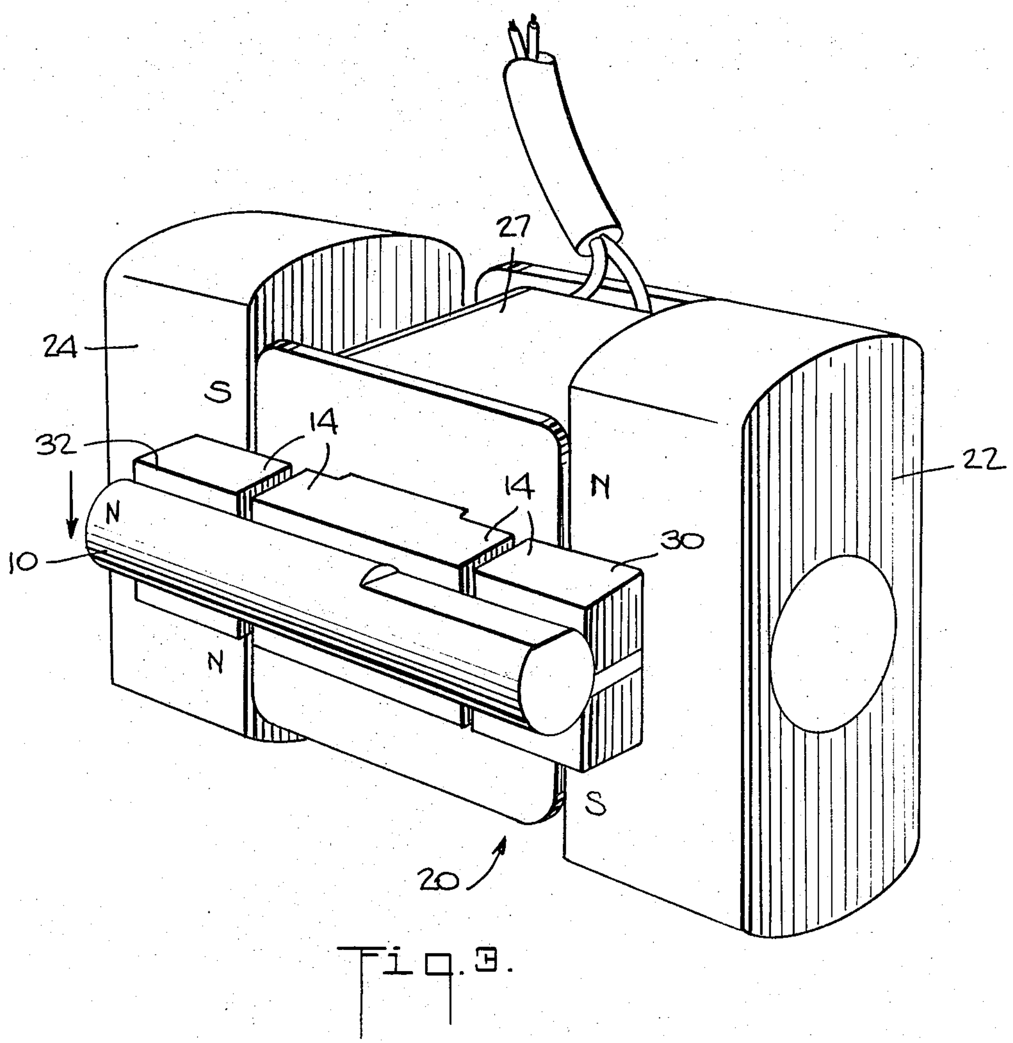
FIG. 3 is a perspective illustration of a reading head adapted to take advantage of the properties of the FIG. 1 device.

FIGS. 3–5 illustrate the kind of read head that can be used to advantage with the device 10 of this invention. As shown, the head 20 comprises two permanent magnets 22, 24, a low reluctance E-shaped core 26 and a pick-up coil 27 wound on the middle leg 28 of the core 26. The permanent magnets 22, 24 provide a field that sets the wire; specifically, that permits capturing the core 12 from the shell 14 by virtue of the field provided by the two permanent magnets 22, 24. In part, due to the proximity of the pick-up core 26 to the two permanent magnets 22, 24, the pick-up core 26 tends to provide a low reluctance path for much of the flux generated by the two permanent magnets 22, 24. To prevent the flux from the magnets 22, 24 from being shunted by the core 26, the legs 30, 32 of the pick-up core 26 are placed in contact with like polarities of the two magnets 22, 24. This structural arrangement assures that there will be a substantial flux path between north and south poles in the air between opposed permanent magnets 22, 24. This substantial flux in the air path between the two magnets 22, 24 is then available to force the wire 10 into the FIG. 2 high energy state when the wire comes into proximity with the field in this air path.

The north pole 22N faces the south pole 24S while the south pole 22S faces the north pole 24N. Because of the arrangement described above, the south poles 22S and 24S are in contact with the pick-up core 26 and thus the flux generated by these magnets 22, 24 is in large part completed through the space between facing poles. Specifically, there is a first field having a first direction between poles 22N and 24S and a second field having an opposite direction between poles 24N and 22S.

As best seen in FIG. 3, the wire 10 moves across the face of the pick-up head 20 in the direction shown by the arrow. The wire 10 is oriented to be aligned with the fields between opposing poles 22N and 24S. Thus as the wire 10 enters the area of the head 20, and with the wire polarity indicated, this results in the wire 10 being switched from the FIG. 1 state to the FIG. 2 state during this first portion of the travel of the wire 10 across the face of the head 20.

The specific effect of the field between the pole 24N and the pole 22S (that is the second field) results in a substantial cancellation of the fields from the magnets 22, 24 when the wire 10 travels to the position as shown in FIG. 3. Thus, at this midpoint in the travel of the wire 10 across the face of the head 20, the wire 10 switches from its FIG. 2 state to its FIG. 1 state. This switching results in a change in the flux external to the wire 10 and this change is sensed by the pick-up coil 27 to provide a distinctive output pulse.

As the wire 10 proceeds further across the face of the head 20, the field between the poles 24N and 22S has a direction that has no effect on the state of the wire 10. The value of the arrangement shown in providing opposing fields on either side of the center of the head 20 is to establish a definite and repeatable position for the switching of the wire 10 from its FIG. 2 state to its FIG. 1 state.

When the wire 10 moves across the face of the head 20, its movement is the movement of a magnetized ferromagnetic wire element 10 across the reading face of the head 20. Thus there will be a rate sensitive change of flux completed to the head 20. But no matter how fast the wires 10 are processed through the reading head 20, the magnetic coupling due to the rate at which the wires 10 are passed through the reading head is not seen by the coil 27. This is because this rate responsive coupling is either shunted entirely through the legs 30 and 32 so that it is not passed through the center leg 28 or, to the extent that there is some separate coupling through the center leg 28, the effect the flux coupling by the right half of the wire 10 cancells out the effect of the flux coupling by the left half of the wire 10. In any case, the only flux change seen by the coil 27 is that due to the switch of state of the wire 10 from the FIG. 2 state to the FIG. 1 state.

As shown in FIGS. 3 and 4, the legs 27, 30 and 32 of the core 26 are preferably flanged. This flanging means it is less critical then it otherwise might be that each wire 10 be precisely positioned and have its compressed half precisely equal in length to the non-compressed half. Flanges provide a more reliable and repeatable result than would be provided by a core 26 that did not have these flanges 34.

It has been found that there will usually be an optimum orientation between the wire and the head. The head can be rotated in order to obtain this optimum oritnetation. The optimum orientation is one which provides the sharpest and most distinct output pulse. This sharpest and most distinct output pulse is one with the best signal to noise ratio. The reason why a particular head design may require some experimentation as to the optimem angle between the head and the wire is believed to arise from the fact that the field created by the head and by the relationship between the head and the wire is somewhat complex in configuration. Thus, there is an optimum position for the wire in that field in order to obtain a condition in which the external field is sufficiently weak along the whole length of the wire so that the wire can switch (that is, so that the shell can recapture the core) in a complete and rapid fashion.

A Binary Code

In terms of using the device of this invention as a binary code, FIGS. 4 and 5 illustrate a deployment of the wire 10 that provides plus and minus pulse outputs from the reading head 20 shown in FIG. 3. These wires 10 can be mounted, for example, as a series of successive wires along the length of a credit card and passed along the face of the reading head 20. The wire 10 will successively switch from the state shown in FIG. 1 to the state shown in FIG. 2 as they enter the reading head and switch back from the state shown in FIG. 2 to the state shown in FIG. 1 at a predetermined central position along the face of the reading head 20. If the compressed or "cancelled" end 16 is on the left, as shown in FIG. 3, the flux change on switching from the FIG. 2 state to the FIG. 1 state will provide an increase in the magnitude of flux along the path and in the direction shown by the flux line in FIG. 3. By contrast, when the cancelled portion 16 is on the right half of the wire 10, then the switching of that wire from the FIG. 2 state to the FIG. 1 state will provide an increase in the magnitude of the flux along the path and in the direction shown in FIG. 4. Since the direction of the flux through the center leg 28 and pickup coil 27 is in opposite directions in FIGS. 3 and 4, an increase in the absolute magnitude of that flux represents opposite algebraic changes in the flux coupled through the pickup coil 24 and thus will result in opposite pulse output polarities.

The initial switching from the FIG. 1 state to the FIG. 2 state occurs at a position of the wire 10 sufficiently removed from the face of the core 26 so that the flux change is not coupled through the core 26 and coil 27.

The Magnetic Switching Mechanism

The FIGS. incorporate an attempt to describe the manner in which the device of this invention switches state. The hypothesis employed to describe the operation of this invention employs a concept of a magnetically harder shell 14 surrounding a core 12. According to this hypothesis, when the wire segment 10 (which may be a 0.4 inch segment of ferromagnetic wire) has been magnetized and the magnetizing field removed, the higher coercivity shell retains the direction of magnetization imposed on it by the external field that magnetized the wire but causes the direction of the magnetization of the core to reverse so that the flux generated by the higher coercivity shell can complete its path through the core 12. The core 12, having a lower reluctance, provides the easier path for the completion of flux generated by the shell and since the core is assumed to have a much lower coercivity than the shell 14, the magnetization of the core can be reversed under the domination of the shell. Again, according to this hypothesis, when an external magnetic field, such as is represented by the magnet 18, is brought close to the wire 10 and when this external magnetic field is strong enough to overcome the effect of the shell 14 on the core 12, then the ferromagnetic field will switch the direction of the magnetization from the core from that shown in FIG. 1 to that shown in FIG. 2. Of course, the magnetization of the magnet has to be appropriate to the magnetization of the shell 14.

The hypothesis as to the switching mechanism involved is the best that applicant is able to provide at the time of filing this patent application. It must be kept in mind, however, that in order to practice this invention, one simply has to known how to fabricate the wire involved and to recognize that the wire switches magnetic state in response to a threshold external magnetic field. It is merely necessary to further recognize that the switching of state of the wire 10 is switch from a first state to a second state in response to an external magnetic field having appropriate magnetization direction and strength and is a switch from a second state to a first state in response to the removal of that external magnetic field. This switching of the state of the wire results in a change in the magnetic field external to the wire 10 and the change in magnetic field can be picked up by an appropriately placed pickup coil to provide a distinctive and thus very usable output pulse.

Further, it can be observed that 1. the core 12, shell 14 portion exhibits a sharp, distinctive flux change in response to a decrease or increase of the external magnetic field past a threshold, and 2. the end portion 16 exhibits no such sharp flux change.

As a result of this latter fact and the three leg head 20 design, even if the wire 10 is fed through the reading head 20 at a very rapid rate, the rate sensitive signal that might otherwise be seen as a background pulse will not be produced at the output of the pickup coil 27 and all that will appear will be the nonrate sensitive pulse due to the switching of the state of the wire 10. This distinctive pulse is not rate sensitive because it occurs in response to a particular threshold value for the magnetic field applied to the wire 10. Once this threshold is achieved, the wire 10 switches state in a way that is substantially independent of the rate at which the wire 10 is moving through the read head. Essentially, it is believed that a transverse domain wall is generated at some point in the core 12 and travels from one end of the core 12 to the other end. The rate at which this domain wall travels is primarily a function of the material of the wire 10 and thus the flux change is at a rate independent of the rate of movement of the wire 10.

Accordingly, it can be seen that one advantage of the device 10 of this invention is to provide an output pulse from the pickup coil 27 which is completely free of any rate sensitive component. If the core 12 and shell 14 extended througout the length of the wire device, then it would not be possible to provide this cancellation or compensation for the rate sensitive induction.

What is claimed is:

1. In a unitary magnetic wire device having first and second magnetic portions wherein at least said first portion is capable of retaining net magnetization after being subjected to a magnetic field, the net coercivity of said first portion is substantially greater than the net coercivity of said second portion, said first portion has substantially the same chemical composition as does said second portion, and said portions are separated solely by a magnetic domain interface when said first portion has a net magnetization in a first direction and said second portion has a net magnetization in a second direction substantially opposite from said direction, the improvement comprising:

the configuration wherein said second magnetic portion is a core portion extending only partially along the axial length of the wire and said first magnetic portion inclludes a shell zone around said core and an end zone axially adjacent to said core.

2. The device of claim 1 wherein said portions each have a magnetic anisotropy, said anisotropy of said portions being parallel.

3. The improvement of claim 1 wherein said coercivity of said portions varies in a substantially continuous fashion throughout said portion and throughout said device.

4. The device of claim 3 wherein said portions each have a magnetic anisotropy, said anisotropy of said portions being parallel.

5. The device of claim 1 wherein each of said portions has a generally uniform chemical composition throughout.

6. The device of claim 5 wherein said portions each have a magnetic anisotropy, said anisotropy of said portions being parallel.

7. The improvement of claim 5 wherein said coercivity of said portions varies in a substantially continuous fashion throughout said portion and throughout said device.

8. The device of claim 7 wherein said portions each have a magnetic anisotropy, said anisotropy of said portions being parallel.

9. The improvement of claim 1 wherein said magnetic domain interface is a domain wall.

10. The device of claim 9 wherein said portions each have a magentic anisotropy, said anisotropy of said portions being parallel.

11. The improvement of claim 9 wherein said coercivity of said portions varies in a substantially continuous fashion throughout said portion and throughout said device.

12. The device of claim 11 wherein said portions each have a magnetic anisotropy, said anisotropy of said portions being parallel.

13. The device of claim 9 wherein said portions each have a magnetic anisotropy, said anisotropy of said portions being parallel.

14. The device of claim 13 wherein said portions each have a magnetic anisotropy, said anisotropy of said portions being parallel.

15. The improvement of claim 13 wherein said coercivity of said portions varies in a substantially continuous fashion throughout said portion and throughout said device.

16. The device of claim 15 wherein said portions each have a magnetic anisotropy, said anisotropy of said portions being parallel.

* * * * *